United States Patent [19]

Berezoutzky

[11] Patent Number: 4,701,072
[45] Date of Patent: Oct. 20, 1987

[54] DRAINING WELL FOR AN UNDERGROUND CAVITY FOR STORING LIQUEFIED GAS UNDER PRESSURE

[75] Inventor: Georges Berezoutzky, Cesson, France

[73] Assignee: Societe Francaise de Stockage Geologique - Geostock, Paris, France

[21] Appl. No.: 898,550

[22] Filed: Aug. 21, 1986

[30] Foreign Application Priority Data

Aug. 21, 1985 [FR] France ............................. 85 12562

[51] Int. Cl.$^4$ ............................................. B65G 5/00
[52] U.S. Cl. ........................................ 405/53; 405/59
[58] Field of Search ................................ 405/52-59; 166/305.1; 62/45, 51; 220/18, 901

[56] References Cited

U.S. PATENT DOCUMENTS 3,084,515  4/1963  Dougherty ........................... 405/53
3,089,309  5/1963  Closs et al. .......................... 405/53
3,505,821  4/1970  Scisson et al. ....................... 405/53

FOREIGN PATENT DOCUMENTS 1040181  8/1966  United Kingdom ................. 405/59
2067276  7/1981  United Kingdom ................. 405/53

Primary Examiner—Cornelius J. Husar
Assistant Examiner—Nancy J. Stodola
Attorney, Agent, or Firm—Sughrue, Mion, Zinn, Macpeak and Seas

[57] ABSTRACT

A draining well (2) extending downwardly from the bottom (3) of an underground cavity for storing liquefied gas under pressure has an upper portion (9) of large area and a lower portion (10) of smaller area. The volume of the upper portion is sufficient for filling a service tube (5) with water up to its hydrostatic equilibrium level. This enables the depth of the draining well to be reduced and thus makes such a storage facility cheaper to produce.

1 Claim, 2 Drawing Figures

DRAINING WELL FOR AN UNDERGROUND CAVITY FOR STORING LIQUEFIED GAS UNDER PRESSURE

The present invention relates to underground storage facilities for storing liquefied gas, e.g. butane and propane, under pressure and inside cavities formed within water-impregnated rock (i.e. including ground water), with the advantage being taken of the hydrostatic pressure in the vicinity of the cavity to balance the gas liquefaction pressure, and more particularly, the present invention relates to a draining wall for such an underground storage cavity.

BACKGROUND OF THE INVENTION

Outwatering takes place permanently from the surrounding rock into such a cavity, and the water collects in the bottom of the cavity. Naturally, such storage can only be used for substances which, in the liquid state, are of lower density than water and which are not miscible with water. The cavity thus contains three superposed phases: at the bottom there is a water phase; above the water there is a liquefied gas phase; and above the liquid surface, the top of the cavity is filled with a gas phase per se. The gas is in equilibrium with the liquid and the pressure is the liquid-vapor equilibrium pressure applicable to the surrounding temperature (generally about 15° C.), with the depth of the cavity being determined as a function of the characteristics of the substance to be stored in order to ensure that it has sufficient hydrostatic pressure.

The storage is used by removing or adding liquid substance, thereby moving the liquid-gas equilibrium surface. The water-liquefied gas phase interface is maintained at a substantially constant level, i.e. it is maintained between two levels which are fairly close together, with water pumps coming into operation whenever the water reaches a given upper level and stopping whenever the water-liquid interface returns to a given lower level.

Such cavity has a bottom which includes a draining well, and generally the bottom has a slight slope towards the well. The upper level for the water is always fixed at some depth below the top of the well, and the liquefied gas extraction orifice is also located within the well, but above the upper water level.

FIG. 1 of the accompanying figures is a diagrammatic cross-section through a common variety of storage facility of the above type. For the purpose of simplifying the explanation, the stored substance is assumed to be butane. However, it must be understood, that the substance could be any other gas which liquefies under pressure, whose liquid density is less than the density of water, and which is not miscible with water in the liquid state.

A cavity 1 has a bottom 3 which slopes gently towards a draining well 2. Four operating ducts are shown diagrammatically: a tube 5 for extracting liquid butane; a tube 6 for pumping out water; a tube 7 for venting gases and opening out into the top of a cavity; and a tube 8 for injecting liquid butane. The water suction orifice 61 is located close to the bottom of the well, and the pump(s) is(are) controlled in such a manner as to maintain the water level between two fixed levels: a top or upper level Ns; and a bottom or lower level Ni. This is quite conventional. The liquid butane suction orifice 51 is placed at a given depth h below the upper of the well, but above the top water level Ns.

When a storage facility is to be "mothballed", i.e. when it is to be taken out of daily use but is not destroyed or damaged, it is conventional practice to fill at least some of the tubes with water or to let the water rise into these tubes up to a level H such that the assembly is in hydrostatic equilibrium. In order to perform this operation safely, the butane suction orifice 51 is placed, for example, at a depth h down the draining well which is sufficient to ensure that the volume of the well above the orifice 51 is greater than the volume of the column of water in the tube(s) up to the equilibrium height H. If the cross-sectional area of the well is noted S and the cross-sectional area of the tube(s) to be filled is noted s, h is determined by the condition:

$$h.S > H.s$$

This is conventional. Safety is obtained at the cost of increasing the depth of the well, thereby requiring digging to go deeper and requiring the tubes to be longer. In other words safety is obtained at the cost of additional expense relative to placing the butane suction orifice 51 level with the bottom 3. The extra depth can be reduced by increasing the cross-sectional area S of the well. However, this increases the cost of the well. In addition, it is preferable for the water to be pumped from a location where the wall is of limited cross-section, for example in order to have sufficiently accurate information on the rate of outwatering.

Preferred implementations of the present invention reconcile the above contradictory conditions.

SUMMARY OF THE INVENTION

The present invention provides a storage facility of the above type with the special feature of a draining well which is constituted by two portions of different cross-sectional area located one above the other, with the top portion being of large cross-sectional area and the bottom portion being of small cross-sectional area. The orifice of a service tube to be filled with water pursuant to mothballing is located in the vicinity of the junction between the two portions.

Thus, the top portion can receive a sufficient volume of water to fill a tube up to a height H which is sufficient for ensuring hydrostatic equilibrium with the pressure inside the cavity. The depth h' of the top portion of larger area S' must still satisfy the above condition:

$$h'S' > H.s$$

The depth of the well is thus reduced for the same volume of material to be excavated, and for the same accuracy in obtaining information about the water level.

BRIEF DESCRIPTION OF THE DRAWINGS

An embodiment of the invention is described by way of example with reference to the accompanying drawings, in which.

DETAILED DESCRIPTION OF THE PREFERRED EMBODIMENT

Items which are common to both figures are given the same references.

The draining well 2 in a cavity in accordance with the invention (see FIG. 2) is constituted by a top portion 9 of large area S' and a bottom portion 10 smaller area s. The bottom portion 10 has the same depth as that portion of the well shown in FIG. 1 which extends below the suction orifice 51. However, its height h' above the suction orifice is reduced. The volume of material that needs excavating to make the well is unchanged relative to the FIG. 1 situation, but its depth is reduced. Digging is thus made easier, and the lengths of the water pump tubes are reduced.

This disposition does not add new drawbacks or difficulties of its own, yet it provides the advantage of reduced installation cost.

Figure 1:
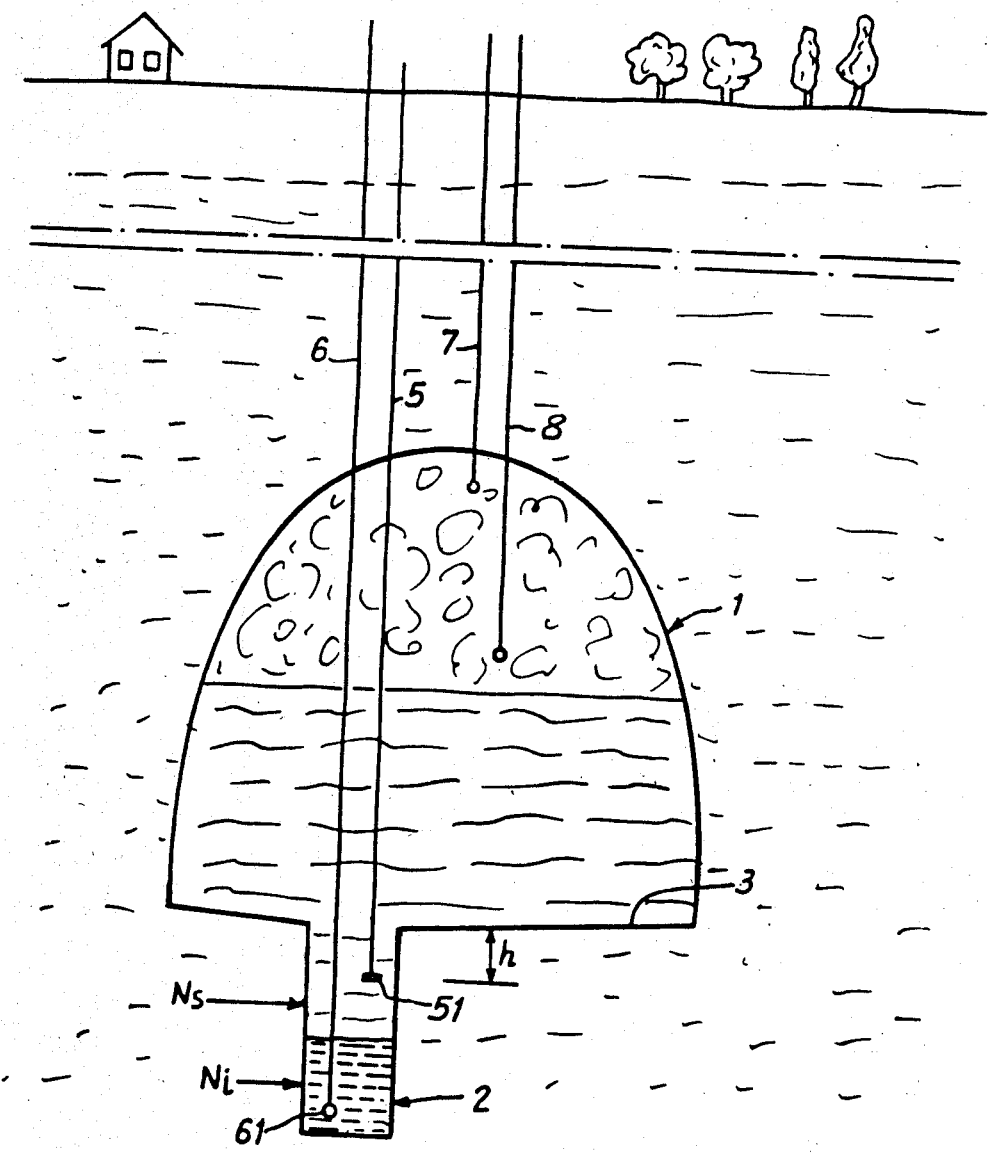
FIG. 1 is a diagrammatic section through a conventional storage cavity.
Figure 2:
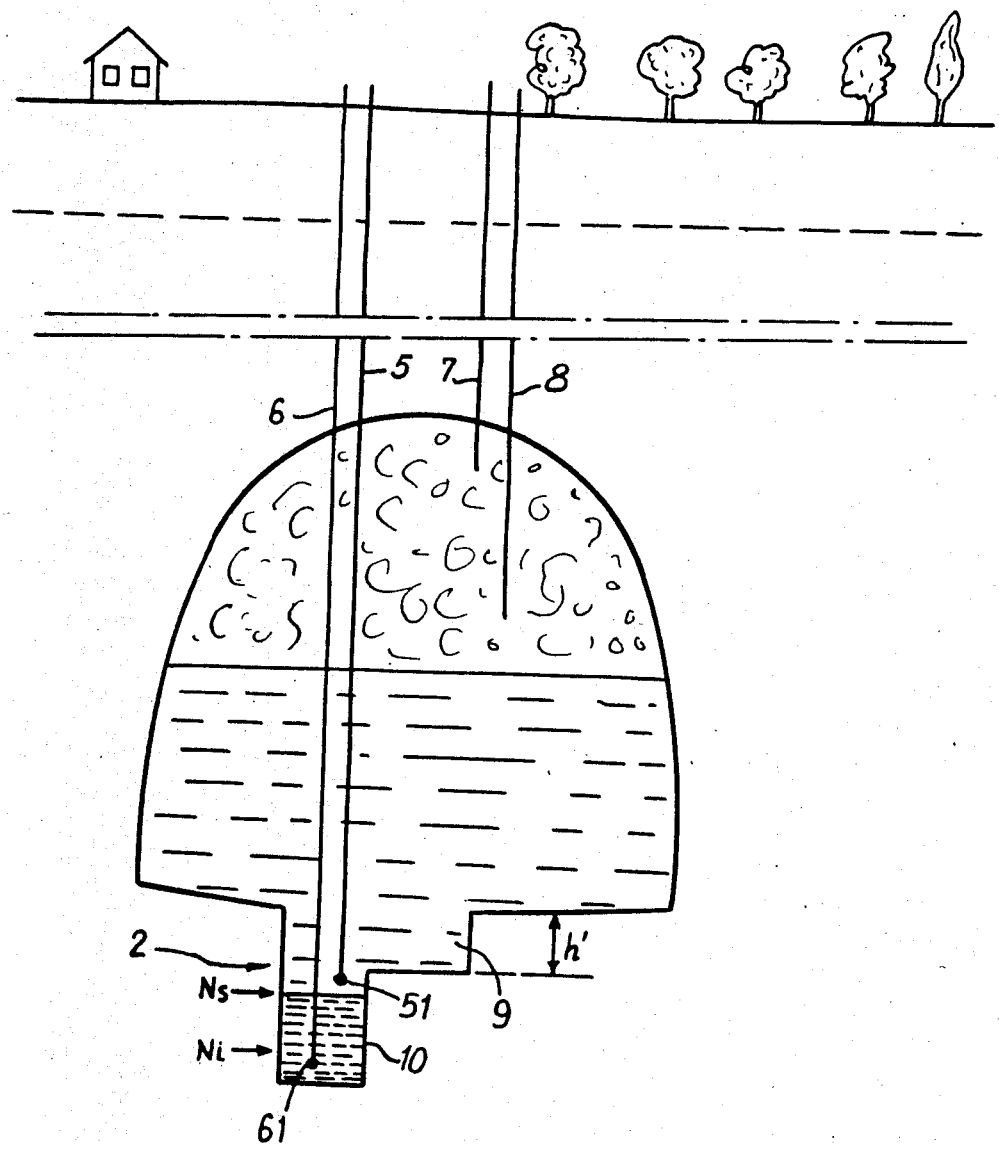
FIG. 2 is similar diagrammatic section through a storage cavity in accordance with the invention.

It is remarkable that cavities of the type shown in FIG. 1 have been constructed for nearly 10 years without providing a reserve volume with an increased cross-section area above the butane suction orifice, thus showing that it was not not obvious to do so.

I claim:

1. An underground storage facility for storing a liquefied gas under pressure and at ambient temperature, said liquefied gas having a lower density than water and being immiscible with water, said facility comprising: a cavity (1) formed in water-impregnated rock for storing said liquefied gas, the hydrostatic pressure in the rock surrounding the cavity implementing the balancing of the gas liquefaction pressure to establish storage equilibrium, a draining or sump well (2) extending downwardly from a bottom (3) of the cavity for collecting and extracting water which seeps into the cavity from the surrounding rock, said well having an upper portion (9) and a contiguous lower portion (10), said upper well portion having a larger cross-sectional area than said lower well portion, a first tube (6) extending downwardly into the lower well portion for extracting water therefrom, a second tube (5) extending downwardly into the well to a point proximate a junction between the upper and lower well portions for extracting liquefied gas from the facility, and means for filling the second tube with water to a height at which hydrostatic equilibrium is established with the pressure in the cavity to implement the mothballing of the storage facility, the volume of the upper well portion above a lower end of the second tube being greater than the volume of said height of water filled in the second tube.

* * * * *